US012192693B2

(12) United States Patent
Kulavik et al.

(10) Patent No.: US 12,192,693 B2
(45) **Date of Patent: *Jan. 7, 2025**

(54) EYEWEAR ACCOMMODATING HEADSET

(71) Applicant: Voyetra Turtle Beach, Inc., White Plains, NY (US)

(72) Inventors: Richard Kulavik, San Jose, CA (US); Thomas M. Schoene, San Diego, CA (US); David Zepp, Poway, CA (US); Juergen Stark, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,539

(22) Filed: Oct. 24, 2023

(65) Prior Publication Data

US 2024/0056716 A1 Feb. 15, 2024

Related U.S. Application Data

(63) Continuation of application No. 17/885,631, filed on Aug. 11, 2022, now Pat. No. 11,805,349, which is a (Continued)

(51) Int. Cl.
*H04R 1/10* (2006.01)
*H04R 5/033* (2006.01)

(52) U.S. Cl.
CPC ......... *H04R 1/1008* (2013.01); *H04R 1/1058* (2013.01); *H04R 1/1091* (2013.01); (Continued)

(58) Field of Classification Search
CPC .. H04R 1/1008; H04R 1/1058; H04R 1/1091; H04R 1/1066; H04R 1/105; H04R 5/033; (Continued)

(56) References Cited

U.S. PATENT DOCUMENTS 5,706,360 A 1/1998 Khandekar
5,920,911 A 7/1999 Cushman
(Continued)

FOREIGN PATENT DOCUMENTS

EP 3188494 7/2017

OTHER PUBLICATIONS

International Search Report and Written Opinion for PCT/US2018/42396, dated Aug. 9, 2018 (13 pages).

*Primary Examiner* — Kile O Blair
(74) *Attorney, Agent, or Firm* — McAndrews, Held & Malloy, Ltd.

(57) ABSTRACT

Systems and methods are provided for an eyewear accommodating headset with adaptive and variable ear support. An example headset may comprise an ear cup with two or more distinct sections that differ in one or more characteristics. A first section is adaptively configured to accommodate a temple piece of a pair of eyeglasses of a wearer of the headset, and a second section is configured to maintain contact with a temple of the wearer of the headset. The different sections may comprise different foams (or different parts of foam, each with different characteristics). The characteristics may comprise hardness and/or density. Another example headset may comprise an ear cup with a divot that accommodates the temple piece of the eyeglasses.

20 Claims, 14 Drawing Sheets

Related U.S. Application Data continuation of application No. 16/910,188, filed on Jun. 24, 2020, now Pat. No. 11,451,895, which is a continuation of application No. 16/160,278, filed on Oct. 15, 2018, now Pat. No. 10,735,843, which is a continuation of application No. 15/693,104, filed on Aug. 31, 2017, now Pat. No. 10,327,056, which is a continuation-in-part of application No. 14/931,915, filed on Nov. 4, 2015, now Pat. No. 9,813,798, which is a continuation-in-part of application No. 14/726, 667, filed on Jun. 1, 2015, now Pat. No. 9,602,905, which is a continuation of application No. 14/458, 366, filed on Aug. 13, 2014, now Pat. No. 9,049,512.

(60) Provisional application No. 61/908,802, filed on Nov. 26, 2013.

(52) U.S. Cl.
CPC ........... *H04R 5/0335* (2013.01); *H04R 5/033* (2013.01); *H04R 2420/09* (2013.01); *H04R 2430/01* (2013.01)

(58) Field of Classification Search
CPC ......... H04R 5/0335; H04R 1/10; A61F 11/14; A61F 9/029
See application file for complete search history.

(56) References Cited

U.S. PATENT DOCUMENTS

| | | | |
|---|---|---|---|
| 8,638,969 | B2 | 1/2014 | Kuhtz et al. |
| 9,049,512 | B1 | 6/2015 | Kulavik et al. |
| 9,602,905 | B2 | 3/2017 | Kulavik et al. |
| 9,813,798 | B2 | 11/2017 | Kulavik et al. |
| 10,327,056 | B2 | 6/2019 | Kulavik et al. |
| 10,735,843 | B2 | 8/2020 | Kulavik et al. |
| 2014/0286520 | A1 | 9/2014 | Ogino |

EYEWEAR ACCOMMODATING HEADSET

CLAIM OF PRIORITY

This patent application is a continuation of U.S. patent application Ser. No. 17/885,631 filed Aug. 11, 2022, which is a continuation of U.S. patent application Ser. No. 16/910,188 filed Jun. 24, 2020 (U.S. Pat. No. 11,451,895), which is a continuation of U.S. patent application Ser. No. 16/160,278 filed Oct. 15, 2018 (U.S. Pat. No. 10,735,843), which is a continuation of U.S. patent application Ser. No. 15/693,104 filed Aug. 31, 2017 (U.S. Pat. No. 10,327,056), which is a continuation-in-part of U.S. patent application Ser. No. 14/931,915 filed Nov. 4, 2015 (U.S. Pat. No. 9,813,798), which is a continuation-in-part of U.S. patent application Ser. No. 14/726,667 filed Jun. 1, 2015 (U.S. Pat. No. 9,602,905), which is a continuation of U.S. patent application Ser. No. 14/458,366 filed Aug. 13, 2014 (now U.S. Pat. No. 9,049,512), which claims the benefit of priority to U.S. Provisional Patent Application No. 61/908,802 filed Nov. 26, 2013.

Each of the above referenced documents is hereby incorporated herein by reference in its entirety.

TECHNICAL FIELD

Aspects of the present disclosure relate to audio technologies, particularly headsets. More specifically, certain implementations of the present disclosure relate to methods and systems for an eyewear accommodating headset with adaptive and variable ear support.

BACKGROUND

Various issues may exist with conventional approaches for headsets. In this regard, conventional systems and methods, if any existed, for accommodating eyewear in headsets, can be costly and/or inefficient. Further limitations and disadvantages of conventional and traditional headsets become apparent to one of skill in the art, through comparison of such systems with some aspects of the present invention as set forth in the remainder of the present application with reference to the drawings.

BRIEF SUMMARY

System and methods are provided for eyewear accommodating headset with adaptive and variable ear support, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Figure 1:
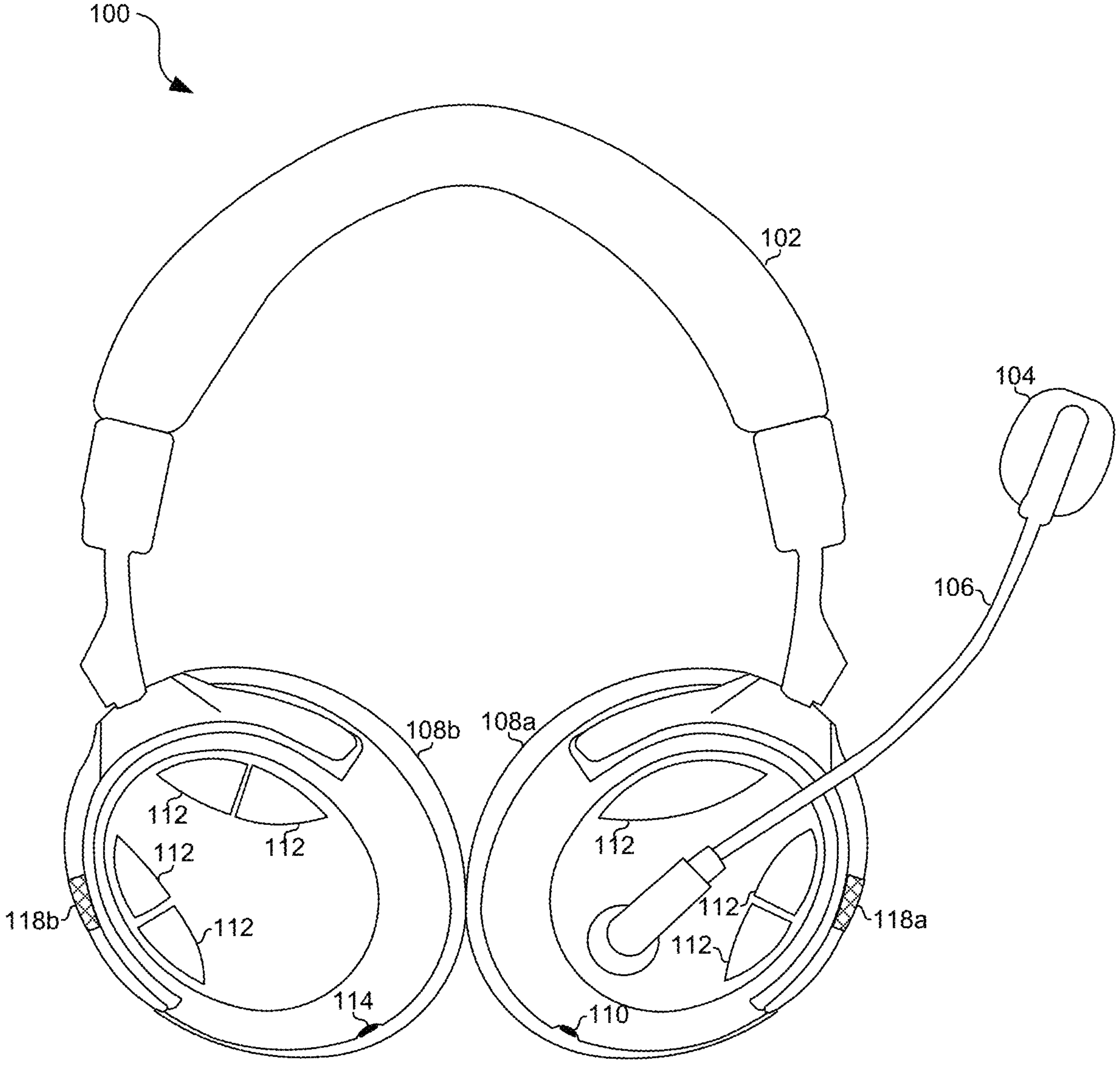
FIG. 1 depicts a first view of a headset configured for accommodating eyewear.
Figure 2:
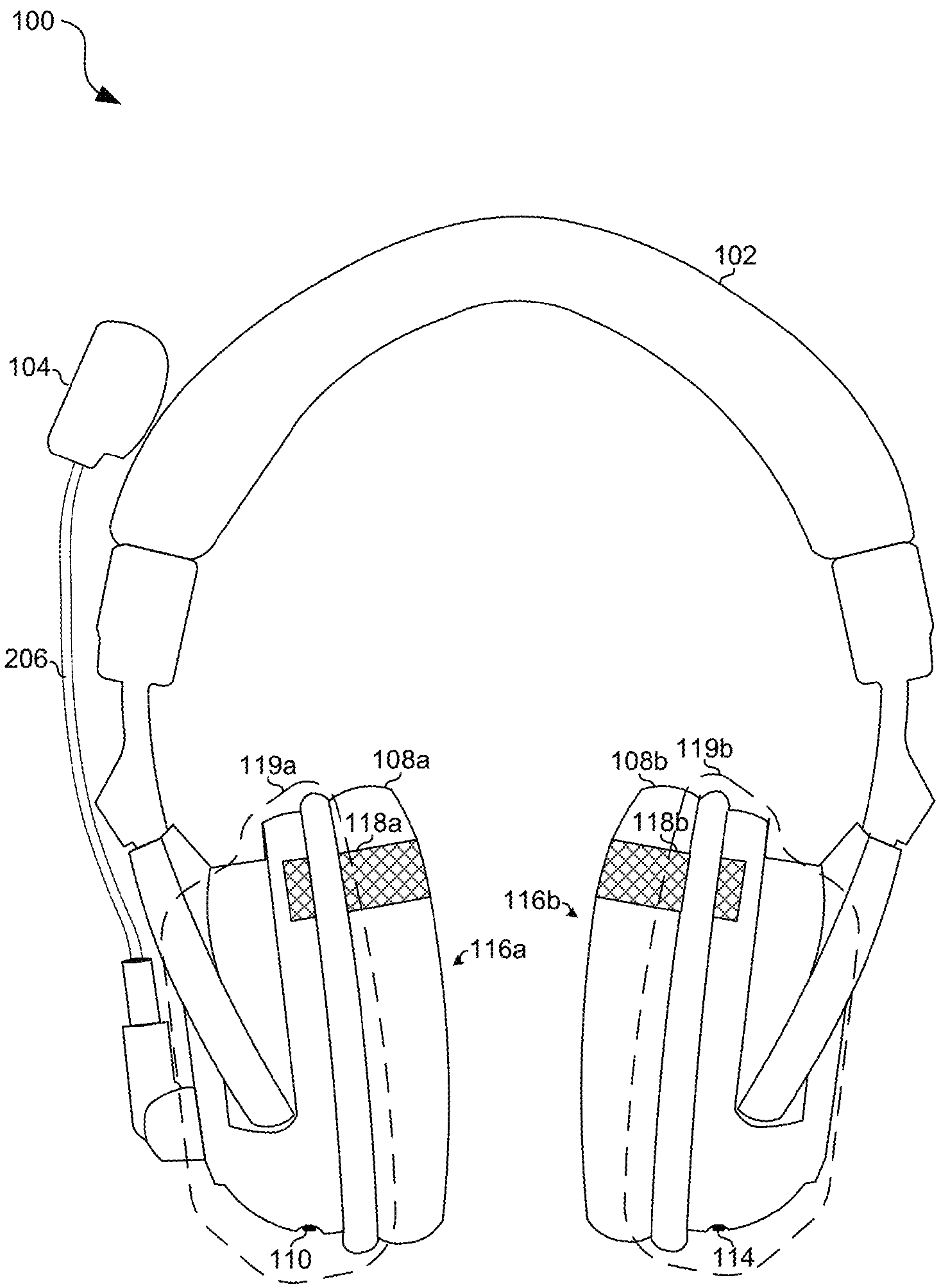
FIG. 2 depicts a second view of the headset of FIG. 1.

Referring to FIGS. 1 and 2, there is shown two views of an example headset 100 that may present audio received from a connected device (e.g., game console) to a listener. The headset 100 comprises a headband 102, a microphone boom 106 with microphone 104, ear cups 108*a* and 108*b* which attach to housings 119*a* and 119*b* which house speakers 116*a* and 116*b*, ear cup shapers in the form of straps 118*a* and 118*b* for accommodating eyewear, connector 110, connector 114, and user controls 112.

The connector 110 may be, for example, a 3.5 mm headphone socket for receiving analog audio signals (e.g., receiving chat audio via an Xbox "talkback" cable).

The microphone 104 converts acoustic waves (e.g., the voice of the person wearing the headset) to electric signals for processing by circuitry of the headset and/or for output to a device (e.g., gaming console, a smartphone, and/or the like) that is in communication with the headset.

The speakers 116*a* and 116*b* convert electrical signals to soundwaves.

The user controls 112 may comprise dedicated and/or programmable buttons, switches, sliders, wheels, etc. for performing various functions. Example functions which the controls 112 may be configured to perform include: power the headset 100 on/off, mute/unmute the microphone 104, control gain/volume of, and/or effects applied to, chat audio by the audio processing circuitry of the headset 100, control gain/volume of, and/or effects applied to, game audio by the audio processing circuitry of the headset 100, enable/disable/initiate pairing (e.g., via Bluetooth, Wi-Fi direct, or the like) with another computing device, and/or the like.

The connector 114 may be, for example, a USB port. The connector 114 may be used for downloading data to the headset 100 from another computing device and/or uploading data from the headset 100 to another computing device. Such data may include, for example, parameter settings. Additionally, or alternatively, the connector 114 may be used for communicating with another computing device such as a smartphone, tablet compute, laptop computer, or the like.

Figure 6B:
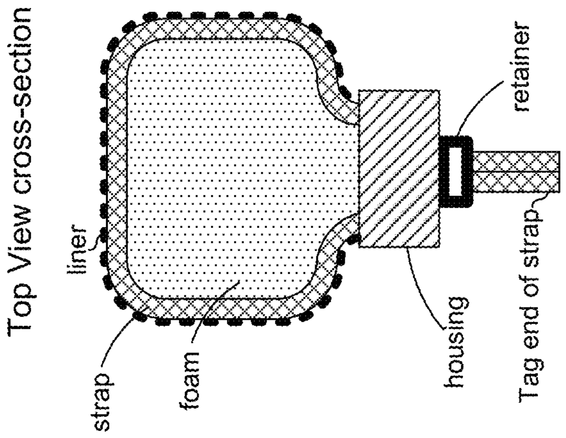
FIGS. 6A and 6B illustrate cross section views of the embodiment of the headset shown in FIG. 5B.
Figure 6A:
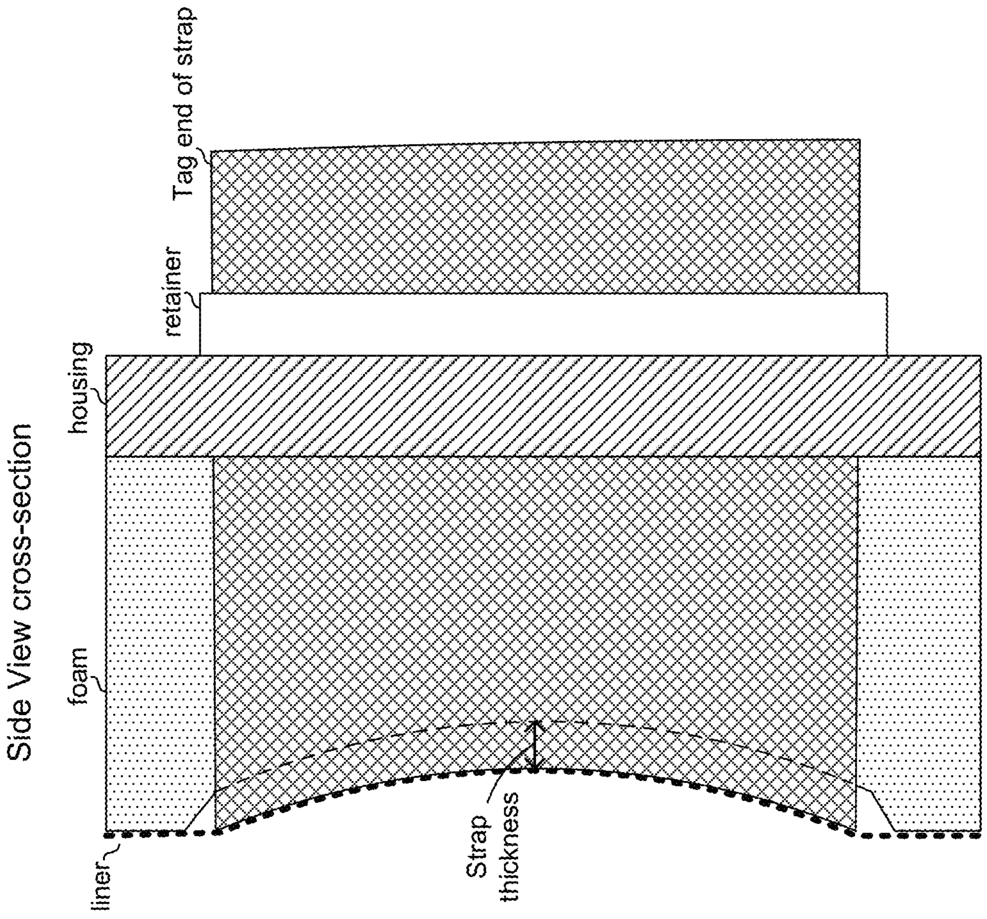

Each of the housings 119*a* and 119*b* may comprise rigid plastic and/or metal for providing shape and support of the headset 200. Each of the ear cups 108*a* and 108*b* is attached to a respective one of the housings 119*a* and 119*b*. As shown in FIGS. 6A and 6B, each of the housings 119*a* and 119*b* may provide a support structure which may be used in applying tension to a respective one of the straps 118*a* and 118*b*.

The ear cups 108*a* and 108*b* are configured for surrounding the wearer/listener's ears and compressing against the wearer/listener's head to create an enclosed acoustic environment for improved sound quality. As shown in FIGS. 6A and 6B, the ear cups 108*a* and 108*b* may comprise, for example, foam that compresses against the listeners head for creating the seal, an outer liner (e.g., a breathable fabric that wicks heat and/or moisture away from the listener's head), and an adjustable strap for deforming the foam to accommodate the temple pieces of a pair of eyeglasses worn by the wearer/listener.

Figure 3:
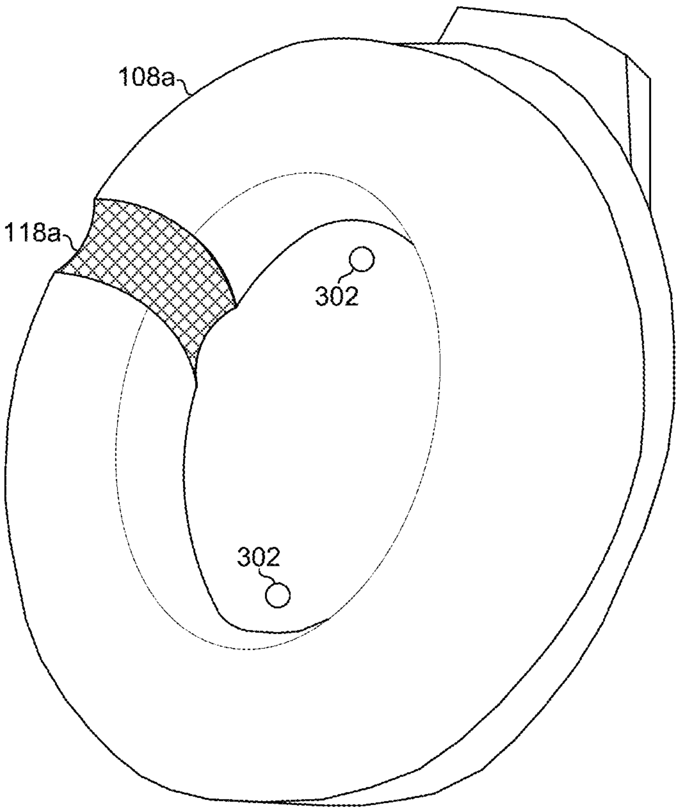
FIG. 3 depicts one of the ear cups of the headset of FIG. 1

FIG. 3 depicts one of the ear cups of the headset of FIG. 1. In FIG. 3, the foam and lining of ear cup 108*a* is deformed, creating space for the temple piece of a pair of eyeglasses, as a result of tension applied to the strap 118*a*. Also shown in FIG. 3 are microphones 302 which may, for example, be used for automatic noise cancellation and/or used for characterizing an acoustic environment inside the ear cup 108*a*, as described below with reference to FIG. 11B.

Figure 4A:
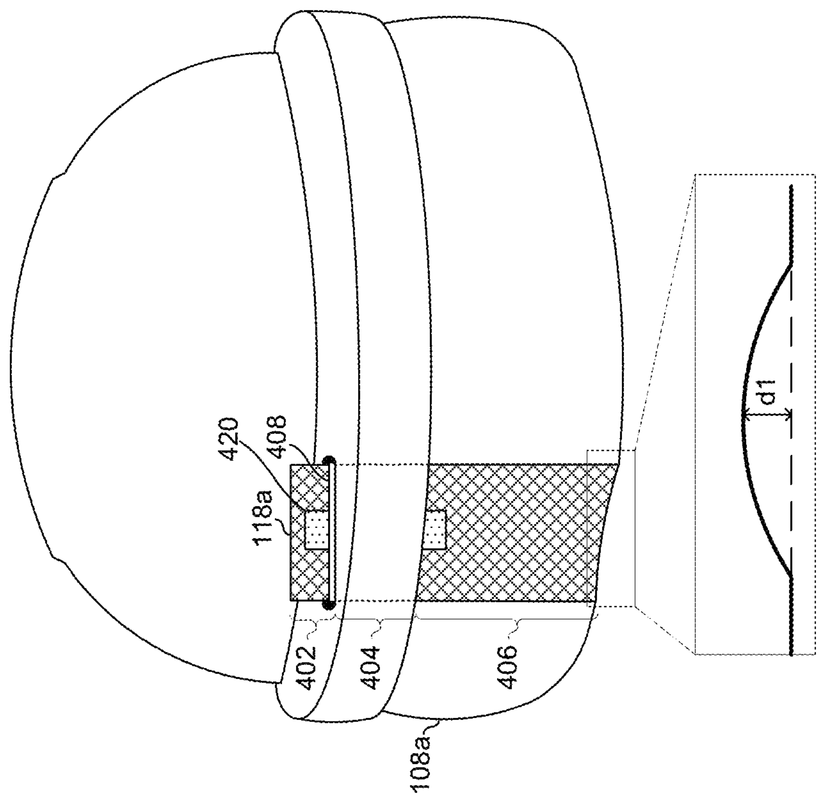
FIGS. 4A and 4B illustrate adjusting the tightness of a strap-type ear cup shaper of a first embodiment of the headset to adjust the amount of space created for the eyewear.
Figure 4B:
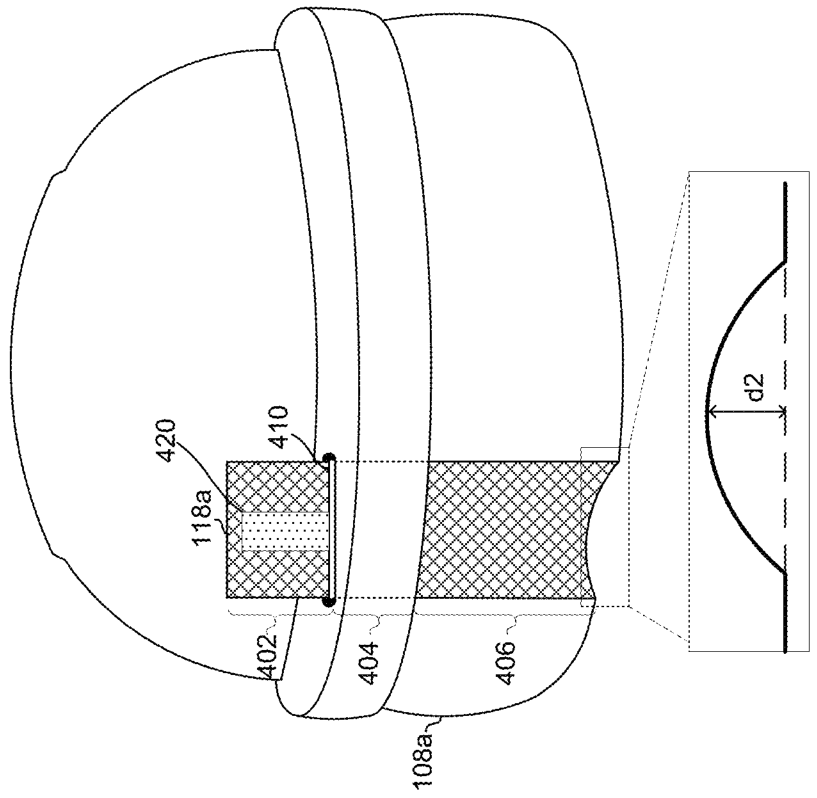
Figure 5B:
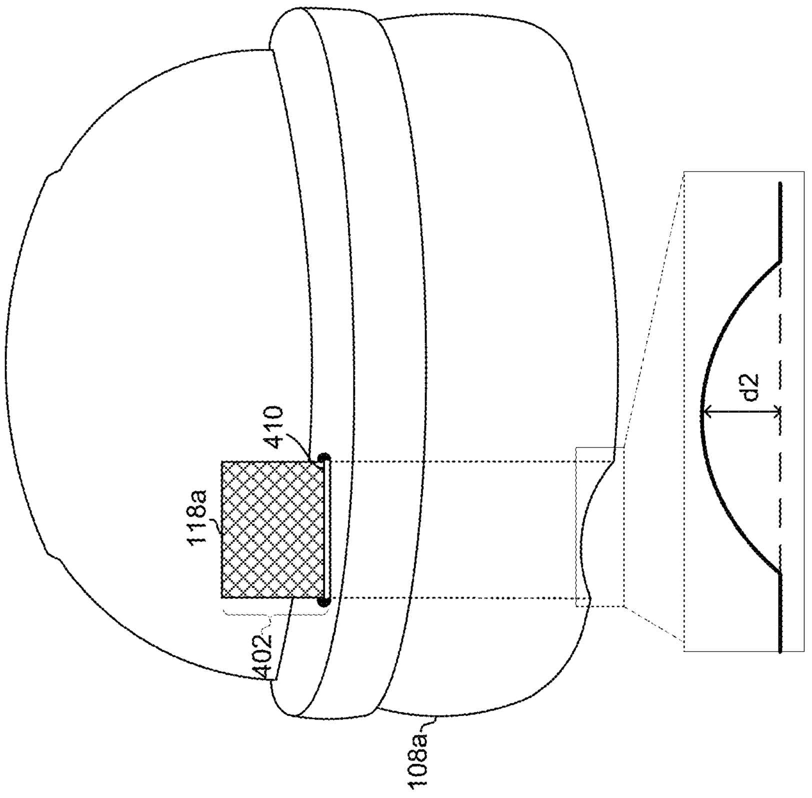
FIGS. 5A and 5B illustrate adjusting the tightness of a strap-type ear cup shaper of a second embodiment of the headset to adjust the amount of space created for the eyewear.
Figure 5A:
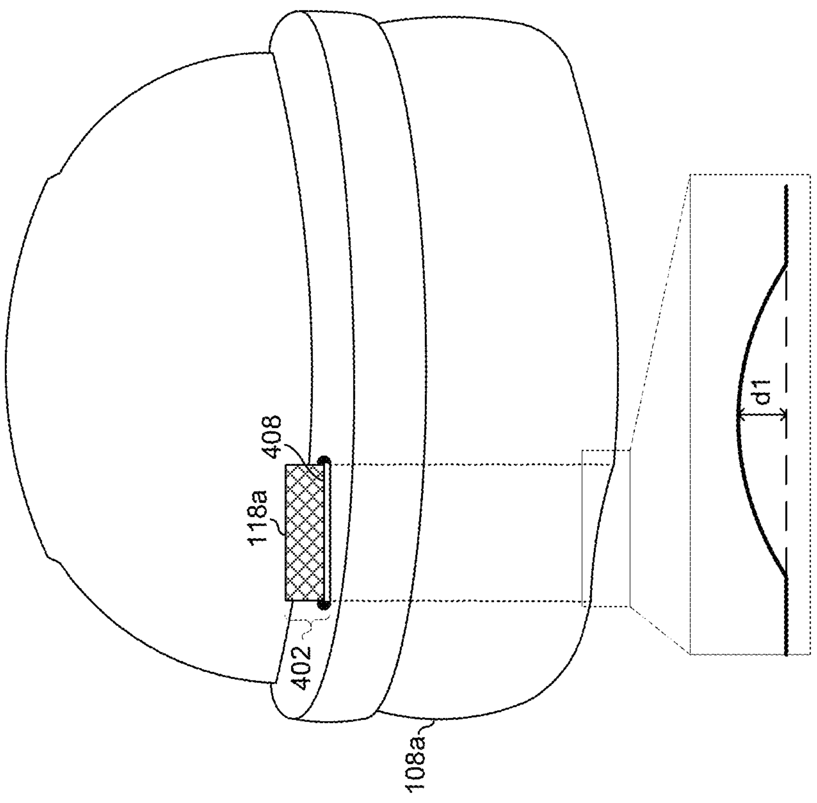

In the embodiment of FIGS. 4A and 4B, the strap 118*a* is on the outside of the ear cup lining. This may be the case, for example, where the straps 118*a* and 118*b* are sold as an after-market add-on. In the embodiment of FIGS. 5A and 5B, the strap is on the inside of the ear cup lining (e.g., stitched to the inside of the lining), as indicated by the dashed lines. The wearer/listener may adjust the tension of the strap 118*a* by pulling (e.g., directly or via a ratchet, dial, or other mechanical assembly) on the tag end 402.

In FIGS. 4A and 5A there is less tension on the strap 118*a* relative to the tension on the strap in FIGS. 4B and 5B. Consequently, in FIGS. 4A and 5A there is a shorter tag end 402 and an accompanying smaller deformation, d1 (e.g., 0), in the ear cup as compared to the longer tag end and larger deformation d2 in FIGS. 4B and 5B. The tension may be maintained by a retaining device 408 which grips the strap 118*a* and braces against the housing 119*a*, as shown in FIGS. 6A and 6B.

In an example embodiment, the strap tension may be fixed and the retaining device 408 may simply be a stitching together of two ends of the strap. In another example embodiment, the retaining device may be such as is found on a clothing belt. In another example embodiment, the retaining device may be buttons, or Velcro, or the like. In another example embodiment, the retaining device may use a ratcheting action such as is used on snow sports boots and/or bindings.

Also shown in FIGS. 4A and 4B is a sensor (e.g., a hall effect sensor) which generates an electrical signal indicating the configuration (i.e., tension or position) of the strap.

Figure 7:
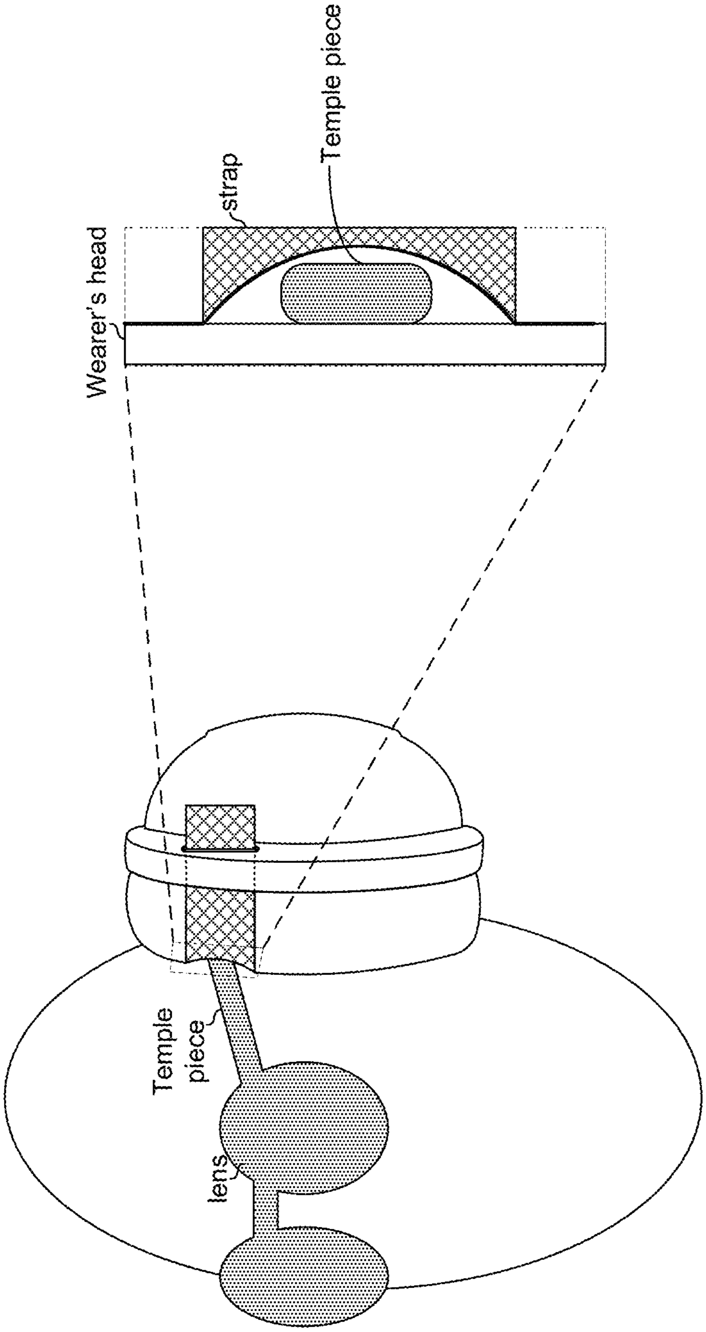
FIG. 7 illustrates how the temple piece of the glasses fits into the depression created by a strap-type ear cup shaper.

FIG. 7 illustrates how the temple piece of the glasses fits into the depression created by the strap. As can be seen from the figure, a larger depression (e.g., d2 of FIG. 4B) may be desired for a bigger temple piece (e.g., thick plastic frames) whereas a smaller depression (e.g., d1 of FIG. 4A) may be desired for a smaller temple piece (e.g., for thin wire frames). As shown, one consequence of the eyeglasses accommodation may be gaps between the wearer's head and the air cup which may affect the audio experience of the wearer. For example, an air leak caused by such a gap may reduce the perceived loudness of low frequency audio (i.e., reduce the perceived "bass response").

Accordingly, the headset 100 may be operable to compensate for such changes in the acoustic environment of the ear cup by adjusting the audio settings applied to the audio signals being output via the speakers 116*a* and 116*b*.

Figure 8:
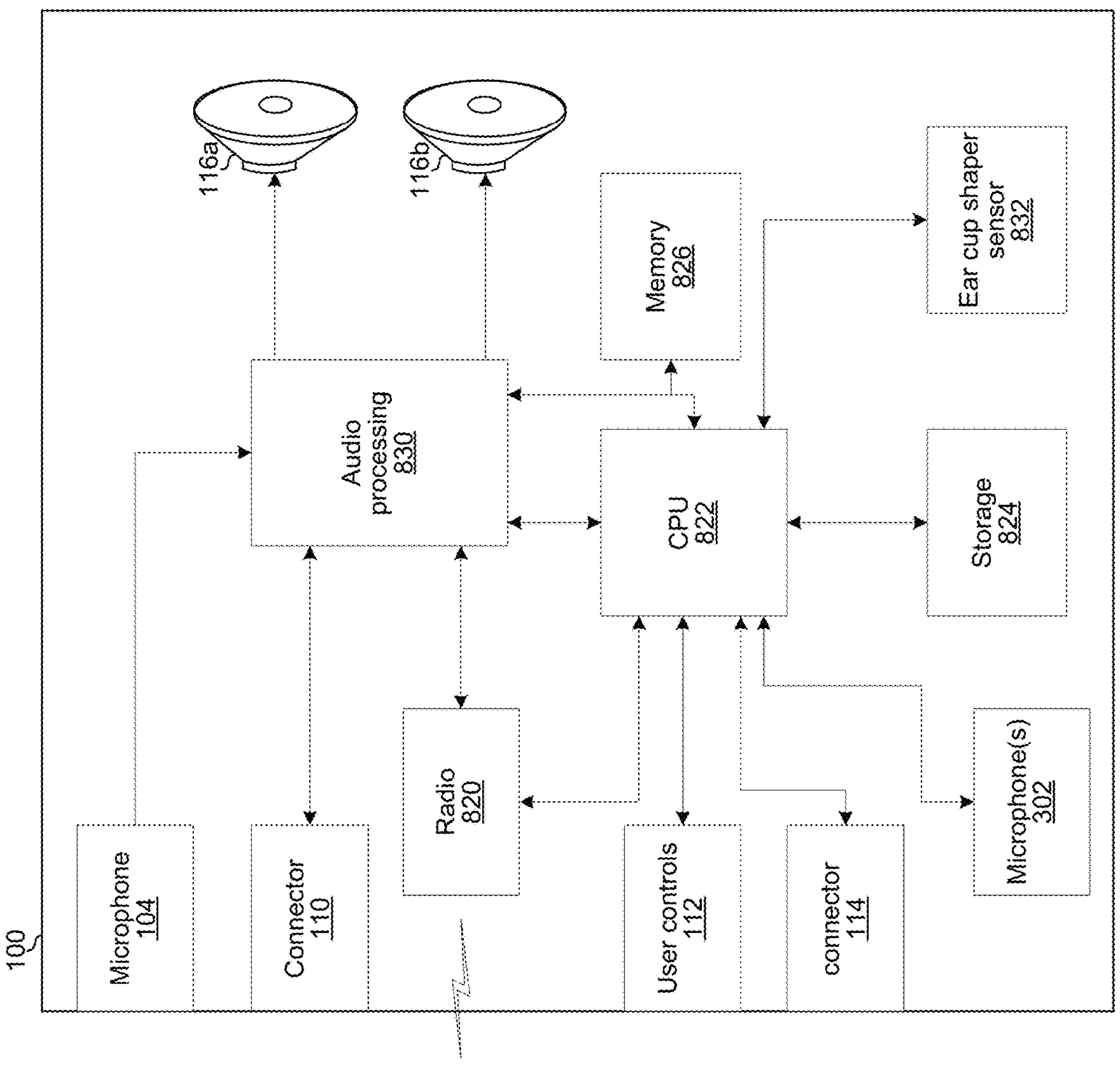
FIG. 8 depicts a block diagram of an example implementation of a headset with eyewear accommodation.

FIG. 8 depicts a block diagram of an example implementation of a headset with eyewear accommodation. In addition to the connector 110, user controls 112, connector 114, microphone 104, microphones 302, and speakers 116*a* and 116*b* already discussed, shown are a radio 820, a CPU 822, a storage device 824, a memory 826, an audio processing circuit 830, and an ear cup shaper sensor 832.

The radio 820 comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation 300).

The CPU 822 comprises circuitry operable to execute instructions for controlling/coordinating the overall operation of the headset 100. Such instructions may be part of an operating system or state machine of the headset 100 and/or part of one or more software applications running on the headset 100. In some implementations, the CPU 822 may be, for example, a programmable interrupt controller, a state machine, or the like.

The storage device 824 comprises, for example, FLASH or other nonvolatile memory for storing data which may be used by the CPU 822 and/or the audio processing circuitry 830. Such data may include, for example, parameter settings that affect processing of audio signals in the headset 100 and parameter settings that affect functions performed by the user controls 112. For example, one or more parameter settings may determine, at least in part, a gain of one or more gain elements of the audio processing circuitry 830. As another example, one or more parameter settings may determine, at least in part, a frequency response of one or more filters that operate on audio signals in the audio processing circuitry 830.

As another example, one or more parameter settings may determine, at least in part, whether and which sound effects are added to audio signals in the audio processing circuitry 830 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 100 in accordance with one or more algorithms, based on user input (e.g., via controls 112), and/or based on input received via one or more of the connectors 110 and 114.

The memory 826 comprises volatile memory used by the CPU 822 and/or audio processing circuit 830 as program memory, for storing runtime data, etc.

The ear cup shaper sensor 832 comprises circuitry operable to detect the position of one or both of the ear cup shapers of the two ear cups 108*a* and 108*b*. In the case of strap-type ear cup shapers 118*a* and 118*b*, for example, the sensor 832 may sense tension on one or both of the straps 118*a* and 118*b*, amount of deformation in the foam as a result of one or both of the straps 118*a* and 118*b*, and/or the presence (e.g., through thermal and/or skin conductance measurements) or size (e.g., through sound pressure measurement) of an air-gap between one or both of the ear cups 108*a* and 108*b* and the wearer's head as a result of the straps 118*a* and/or 118*b*.

In the case of plunger-type ear cup shapers 902*a* and 902*b* (FIGS. 9A-9D, below) for example, the sensor 832 may sense whether the plunger is extended or depressed, amount of deformation in the foam as a result of one or both of the plungers 902*a* and 902*b*, and/or presence and/or size of an air-gap between one or both of the ear cups 108*a* and 108*b* and the wearer's head as a result of the plungers 902*a* and 902*b*.

For strap-type ear cup shapers, the sensor 832 may comprise, for example, a magnet with hall effect sensor for each strap (i.e., the voltage produced on the hall element varies with position of the strap). For strap-type ear cup shapers, the sensor 832 may comprise, for example, a wheel or track ball that rolls as the strap is tightened or loosened. For a plunger-type ear cup shaper, the sensor 832 may comprise, for example, a potentiometer, a simple binary (on/off) switch or contact, and/or the like.

The measurement(s) from the sensor 832 may be fed to the CPU 822 and/or audio processing circuitry 830 and processing of audio may be adjusted based on the measurements. For example, phase, amplitude, frequency, and/or some other characteristics of audio signals being output to the speakers 116*a* and 116*b* may be adjusted to compensate for the acoustic environment corresponding to the current measurement(s). For example, to account for an air gap between the ear cup 108*a* and the wearer's head created by an ear cup shaper, the bass of the audio signal being output the speaker 116*a* may be boosted to maintain a desired bass loudness.

For example, based on the state of the ear cup shaper (e.g., whether a plunger-type shaper is depressed or extended or whether a strap-type shaper is tight or loose) a DSP tuning correction factor applied to the output audio signals by audio processing circuitry 830 may be enabled or disabled. In an example implementation, the state of the ear cup shaper may be used for identifying a wearer of the headset (e.g., where two siblings share the headset but only one of them wears glasses, which may be stored in user profile/settings).

The audio processing circuit 830 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 830 may be determined, at least in part, by one or more measurements from the sensor 832. The processing may be performed on game, chat, and/or microphone audio that is subsequently output to speaker 116*a* and 116*b*. Additionally, or alternatively, the processing may be performed on chat audio that is subsequently output to the connector 110 and/or radio 820.

FIGS. 9A-D depict an example implementation where retractable rigid structures positioned inside filler material of the ear cups (e.g., foam) enable the headset to comfortably accommodate temple pieces of eyeglasses.

Figures 9A, 9B, 9C, 9D:
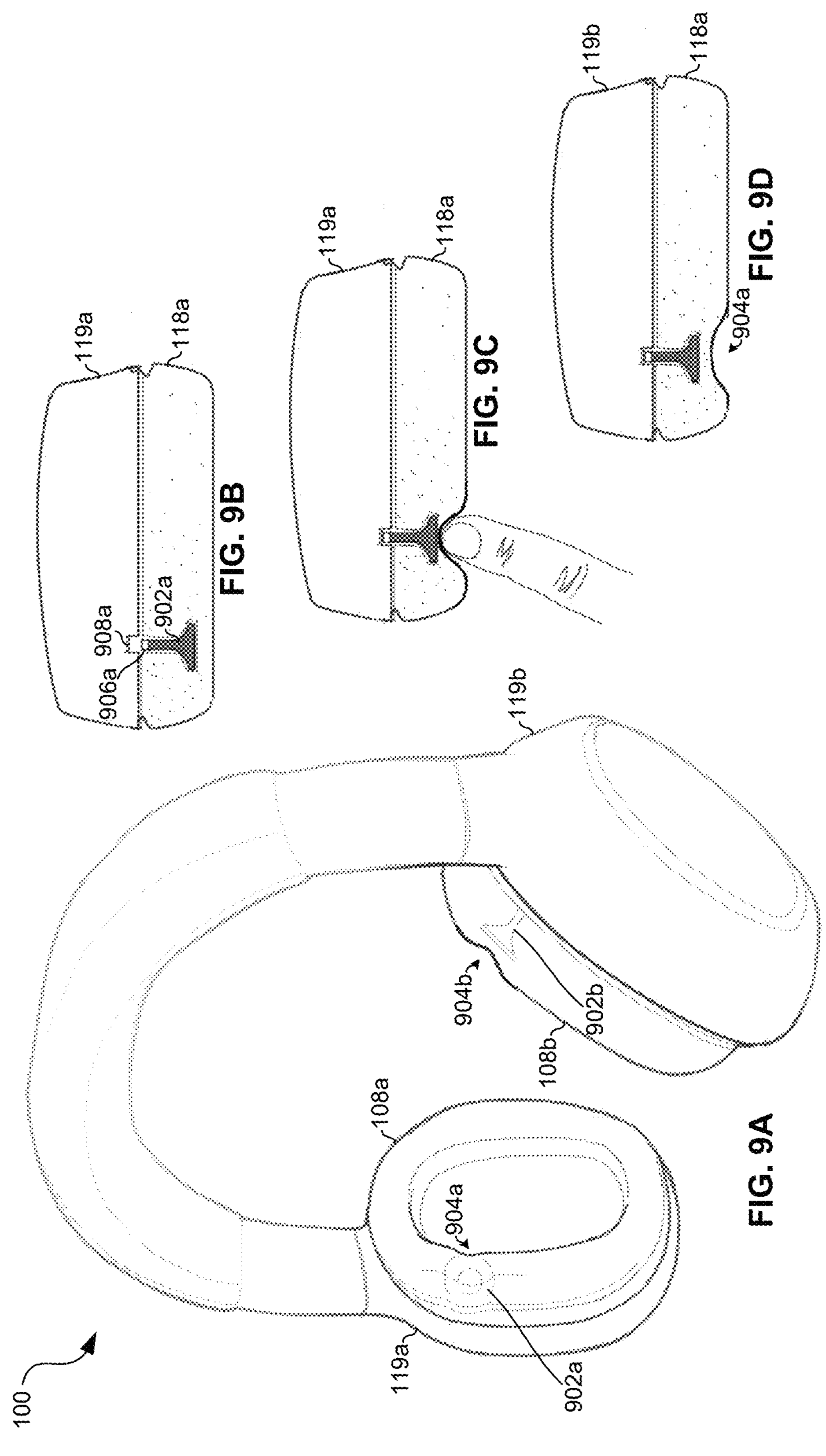
FIGS. 9A-D depict an example implementation where retractable structures positioned inside the foam of the ear cups enable the headset to accommodate temple pieces of eyeglasses.

FIG. 9A shows the entire headset 100 with depressions 904*a* and 904*b* in ear cups 108*a* and 108*b*, respectively, created by plunger 902*a* and 902*b*, respectively, which are within the ear cups 108*a* and 108*b*. As shown in FIG. 9B, when the plunger 902*a* is in an extended position such that deformation 904*a* is not present. FIG. 9C shows a user retracting the plunger 902*a* by pressing on it. FIG. 9D shows the structure in a retracted position such that deformation 904*a* is present to accommodate the temple piece of a pair of eyeglasses.

In an example implementation, the components 906*a* and 908*a* comprise a magnet 906*a* and a magnetic contact 908*a* such that the plunger 902*a* is held in a retracted position by magnetic force. In such an embodiment, the plunger 902*a* may be returned to the extended position by squeezing the ear cup 108*a* to exert an extension force that overcomes the magnetic force. In another example implementation, the components 906*a* and 908*a* may comprise a mechanical latch as is found in retractable ballpoint pens. In such an implementation a first push of the plunger 902*a* compresses the foam and engages the mechanical latch, and a second push of the plunger compresses the foam beyond the retracted position and disengages the mechanical latch allowing the foam to decompress (possibly aided by a spring) and return the plunger to the extended position.

In an example implementation, the components 906*a* and 908*a* comprise a magnet and a semiconductor hall element together operating as a hall effect sensor such that a voltage produced on the hall element varies with the position of the plunger 902. In an example implementation, the components 908*a* and 906*a* comprise electrical contacts such that when the plunger 902*a* is retracted a circuitry is completed but when it is open the circuit is broken. In an example implementation, one or both of the components 908*a* and 906*a* may comprise a normally open switch that is closed the plunger 902*a* is retracted and open otherwise.

Figure 10B:
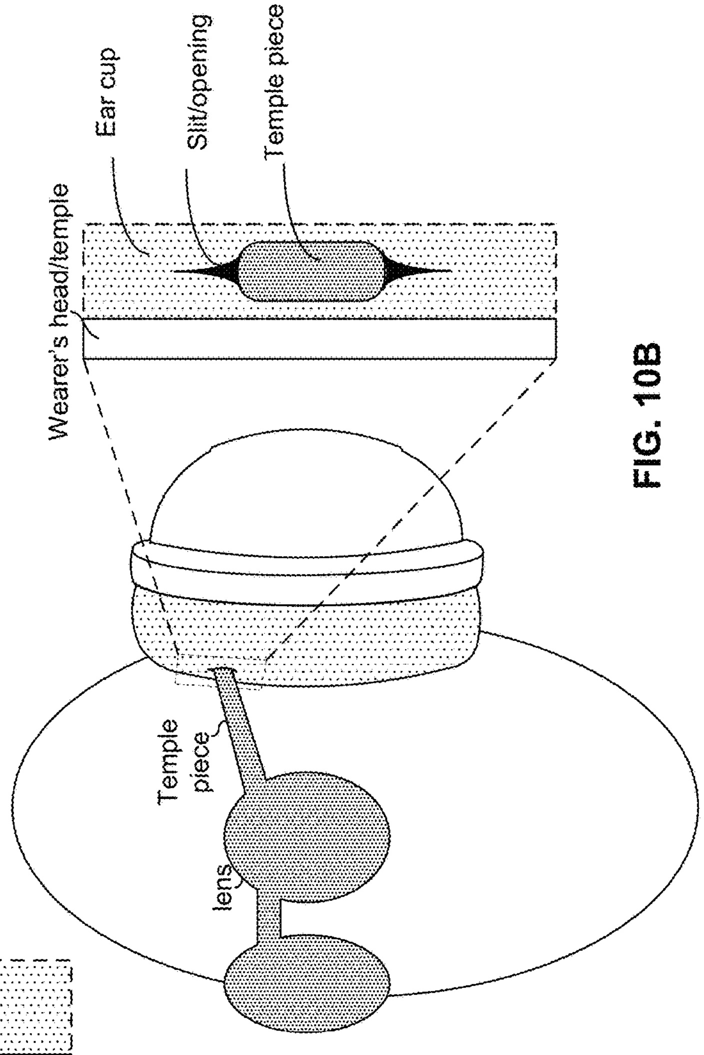
FIGS. 10A-D depict an example implementation in which the ear pieces have openings to accommodate temple pieces of eyeglasses.
Figure 10A:
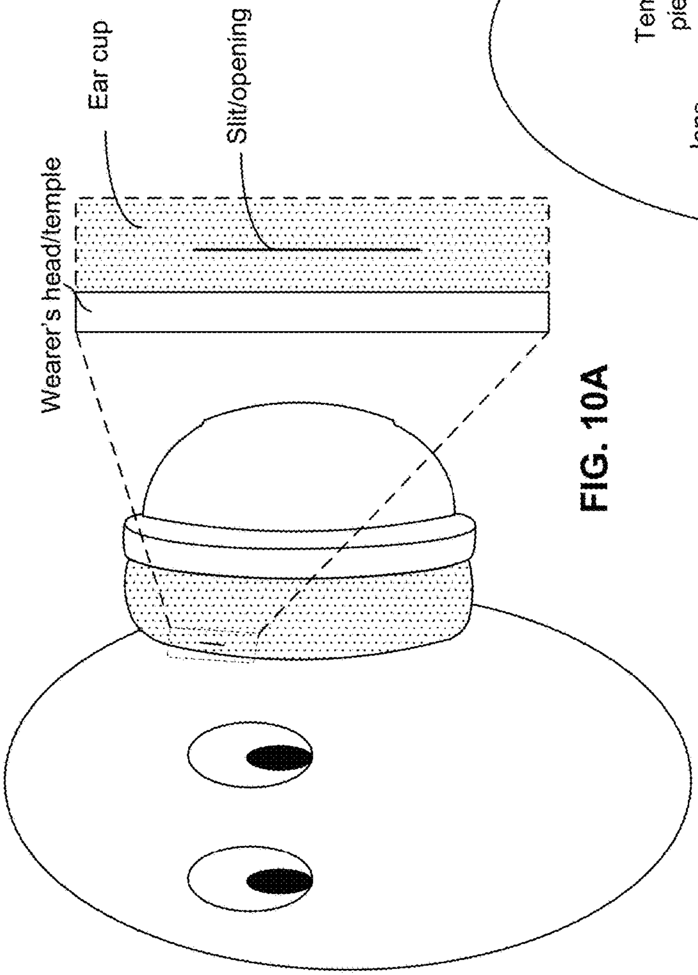
Figure 10D:
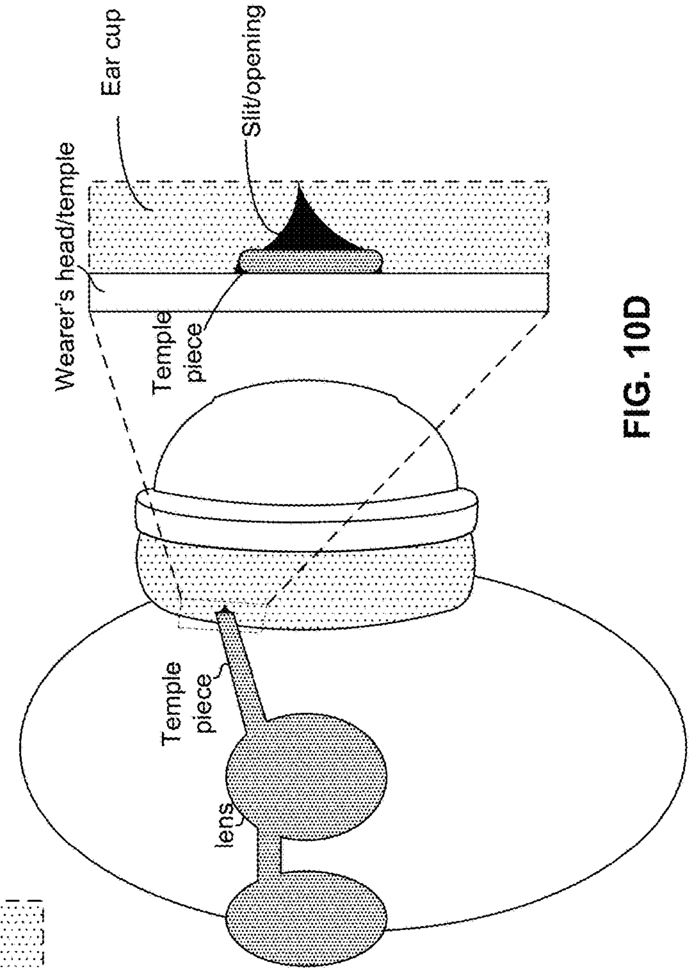
Figure 10C:
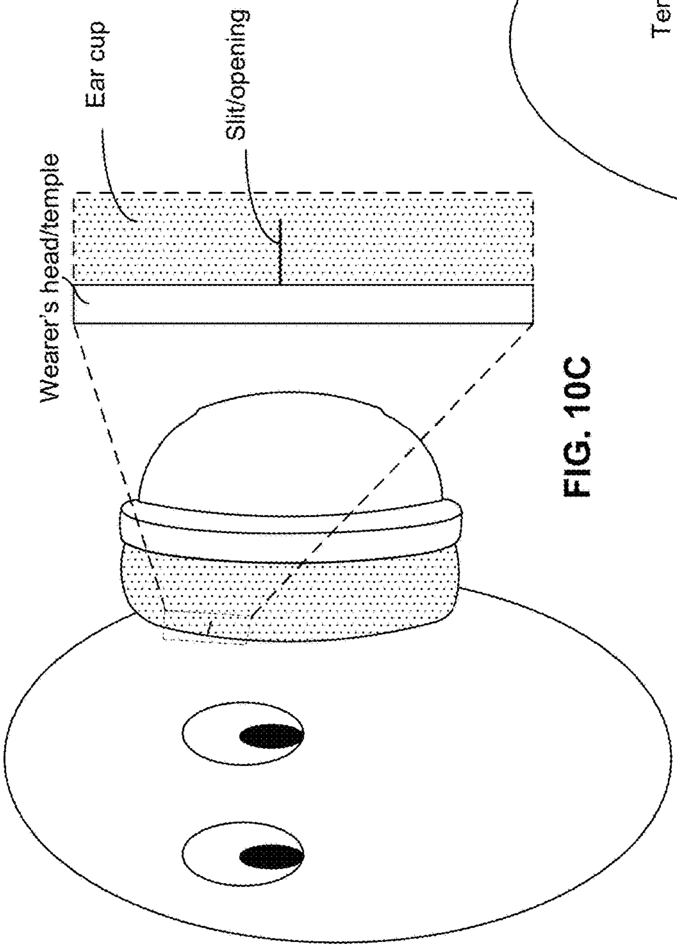

FIGS. 10A-D depict an example implementation in which the ear pieces have openings (e.g., slits) to accommodate temple pieces of eyeglasses. The slits/openings may be such that, when no glasses are being worn by a wearer of the headset, as shown in FIGS. 10A and 10C, the elastic nature of the filler material of the ear cups (e.g., foam) closes the slits/openings. On the other hand, when glasses are worn as shown in FIGS. 10B and 10D, the filler material is pushed aside by the temple piece of the eyeglasses while creating little or no additional pressure on the temples of the wearer as compared to when the headset is worn without the eyeglasses.

In FIGS. 10A and 10B the slits are such that, when eyeglasses are being worn concurrently with the headset, the foam of the headset is between temple pieces of the eyeglasses and the temple of the wearer. In FIGS. 10C and 10D, the filler material (e.g., foam) is pushed out of the way such that the temple pieces contact the temples of the wearer.

Ideally, in the embodiments of FIGS. 10A-10D, the filler material is compressed mostly in the vertical direction such that any additional pressure resulting from the presence of the temple pieces (relative to when the headset is worn without the eyeglasses) is exerted in the vertical directions on the temple pieces, rather than in the horizontal direction on the temples of the wearer. To this end, there may be, for example, hollow areas in the foam adjacent to the slits for receiving the foam that is pushed out of the way by the temple pieces.

Figure 11A:
FIG. 11A is a flowchart illustrating a first example process for adjusting audio settings based on a state of an ear cup shaper.

FIG. 11A is a flowchart illustrating a first example process for adjusting audio settings based on a state of an ear cup shaper. In block 1102, a change in state of an ear cup shaper of ear cup 108*a* is detected. For example, a retraction or extension of a plunger-type ear cup shaper is detected by sensor 832, or a tightening or loosening of a strap-type ear cup shaper is detected by sensor 832. In block 1102, in response to the detection in block 1102 (e.g., the sensor 832 sends a signal indicating the change in state to audio processing circuitry), different audio settings are selected for processing the audio signal being output to speaker 116*a*. This may comprise, for example, increasing gain applied to low frequency components of the audio signal such that bass loudness is approximately the same before and after the change in state of the ear cup shaper.

Figure 11B:
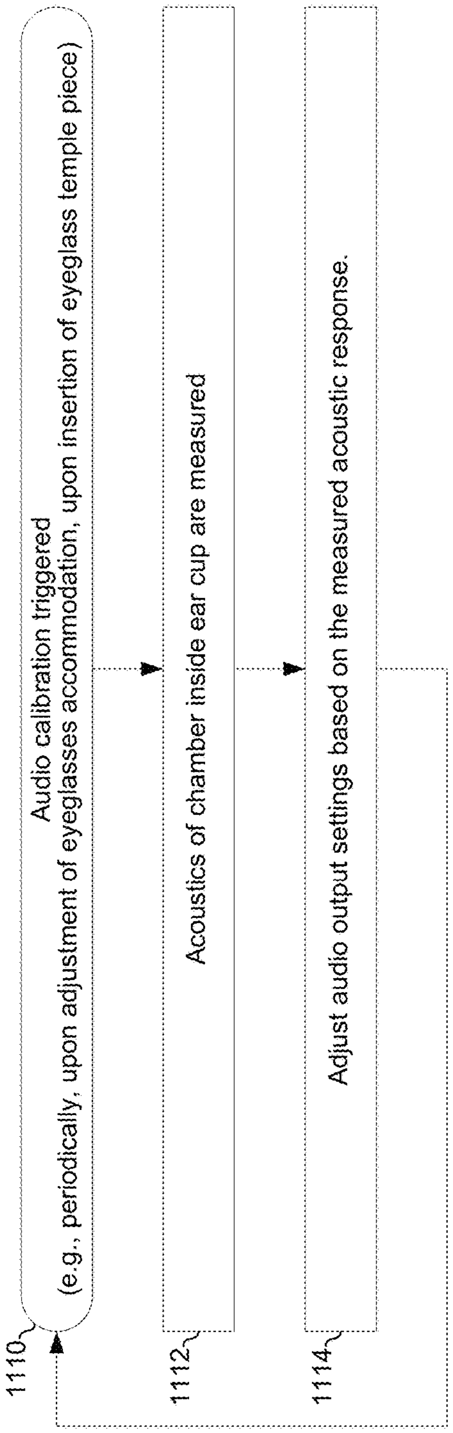
FIG. 11B is a flowchart illustrating a second example process for adjusting audio settings based on a state of an ear cup shaper.

FIG. 11B is a flowchart illustrating a second example process for adjusting audio settings based on a state of an ear cup shaper. In block 1110, calibration of the audio signals being output to the speakers 116*a* and 116*b* of the headset 100 is triggered. Audio calibration may, for example, be triggered periodically, in response to an adjustment of an ear cup shaper (e.g., detected by sensor 832), or in response to the putting on, or taking off, of glasses (e.g., detected by sensor 832).

In block 1112, the acoustics inside the chamber created by an ear cup and the wearer's head are measured. This may comprise audio signals of known characteristics being output to speakers 116*a* and 116*b* and the corresponding acoustic waves being capture by microphones 302. Based on the measured acoustic response, audio settings (e.g., gain and/or phase shift applied to various frequency bands) may be adjusted to achieve the desired actual response. For example, the measured response may reveal that bass is quieter than expected (e.g., due to a gap formed by the ear cup shaper) and the gain applied to low frequency components of the audio signal may be accordingly increased.

In accordance with an example implementation of this disclosure, a headset (e.g., 100) comprises an ear cup (e.g., 100), at least one speaker (e.g., 116*a*), an adjustable ear cup shaper (e.g., strap 118*a* or plunger 902*a*), and circuitry (e.g., 302, 822, 824, 826, 830, and/or 832).

The ear cup shaper is adjustable into at least two configuration, wherein a first of the configurations creates no depression or a first amount of depression in the ear cup (e.g., as in FIG. 4A or FIG. 5A) and a second of the configurations creates a second amount of depression in the ear cup (e.g., as in FIG. 4B or FIG. 5B), the second amount being greater than the first amount. The circuitry is operable to determine which one of the configurations the ear cup shaper is configured into, and set an audio setting applied to an audio signal output to the speaker based on the determined one of the configurations.

For a strap-type ear cup shaper, the first of the configurations may correspond to a first amount of tension on the strap, and the second of the configurations may correspond to a second amount of tension on the strap, where the second amount of tension is greater than the first amount of tension. For a strap-type ear cup shaper, the circuitry may comprise a sensor (e.g., 832) operable to sense tension on the strap, and the determination of configuration may be based on the tension. For a plunger-type ear cup shaper, the first of the configurations may correspond to a retracted position of the plunger, and the second of the configurations may correspond to an extended position of the plunger.

For a plunger-type ear cup shaper, the circuitry may comprises a switch or electrical contact (e.g., 906*a* and/or 908*a*) operable to sense whether the plunger is retracted or extended. The circuitry may comprise a hall effect sensor, and the determination may be based on an output of the hall effect sensor. The audio setting may comprises a gain applied to the audio signal. The gain may be set to a first, higher gain when the ear cup shaper is in the first configuration and to a second, lower gain when the ear cup shaper is in the second configuration.

The audio setting comprises a bass boost setting (i.e., configuration of the gains applied to various frequency bands that increases the perceived loudness of the bass frequencies). The base boost setting may be disabled when the adjustable ear cup shaper is in the first configuration and enabled when the adjustable ear cup shaper is in the second configuration. The ear cup may comprise foam that is compressed a first amount when the adjustable ear cup shaper is in the first configuration and compressed a second amount when the adjustable ear cup shaper is in the second configuration, where the second amount is greater than the first amount. The headset may comprise a microphone (e.g., 302) configured to capture acoustic waves inside a cavity formed by the ear cup, and the determination may be based on the acoustic waves captured by the microphone.

Figure 12:
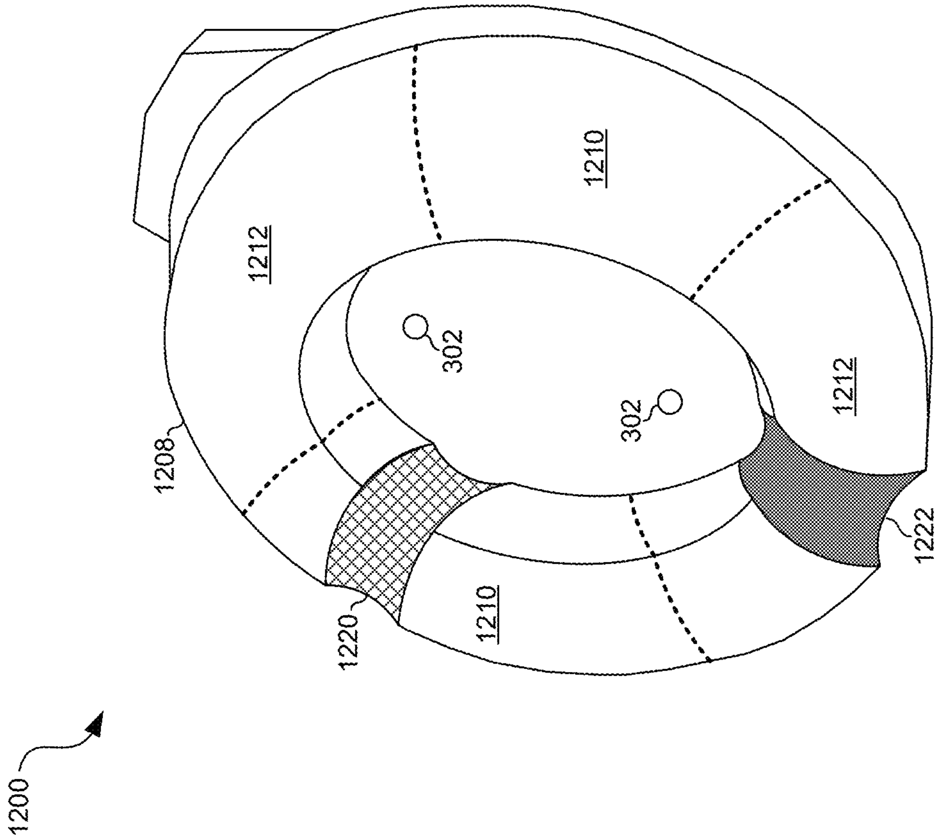
FIG. 12 depicts a headset configured in accordance with example implementation in which the ear cups have parts with different foam for accommodating temple pieces of eyeglasses.

FIG. 12 depicts a headset configured in accordance with example implementation in which the ear cups have parts with different foam for accommodating temple pieces of eyeglasses. Shown in FIG. 12 is headset 1200.

The headset 1200 may be substantially similar to the headset 100, as described with respect to the previous figures. However, the headset 1200 may be configured for accommodating temple pieces of eyeglasses based on use of filler material (e.g., foam) with different characteristics, in a plurality of sections, portions or parts, arranged in a manner to optimize quality of contact with the temple of a wearer of the headset 1200, particularly when the wearer is utilizing eyeglasses.

For example, as shown in FIG. 12, the headset 1200 may comprise ear cups 1208 (similar to the ear cups 108*a* and 108*b* described above, for example). In this regard, the ear cups 1208 may be configured for surrounding the wearer/listener's ears and compressing against the wearer/listener's head to create an enclosed acoustic environment for improved sound quality. The ear cups 1208 may comprise parts, portions and/or sections with different filler material (e.g., foam) profiles (e.g., different filter material, same filler material but with different characteristics, etc.). For example, as shown in the example implementation depicted in FIG. 12, the ear cups 1208 may comprise distinct ear cup areas 1210 and 1212. In this regard, these areas may be arranged, for example, with areas 1212 being at the top and bottom of the ear cup 1208, and areas 1210 on the sides.

The areas 1210 on the side may be where eyeglasses (or specifically temple pieces or straps thereof) pass. Thus, the areas 1210 are designed or implemented so as to allow the eyeglasses (or relevant parts thereof) to pass through more easily, but also to ensure maintaining of contact with the wearer's head and/or prevent compression of the ear cups 1208. In an example implementation, the ear cups may be filled using foam, and as such the areas 1210 and 1212 may comprise foam of different characteristics (e.g., different hardness, density, etc.).

For example, the areas 1210 of the ear cup 1208 include foam 1220 that is different (e.g., different hardness and/or density) of foam 1222 used in the other areas 1212. The two foams 1220 and 1222 may be glued together, thus forming a filler with distinct characteristics within the ear cup 1208. The foam 1220 may be, for example, harder and/or more dense that the foam 1222, thus the areas 1210 may compress more easily when eyeglasses are used, allowing the temple pieces or straps to pass through, while areas 1212 keep the headset 1200 from compressing and the softer areas allow the glasses to pass through more easily.

In an example implementation, the ratio of durometer (hardness) of foam 1222 used in the parts 1212 to the foam 1220 used in the parts 1210 may be substantially large (e.g., greater than 4:1). For example, foam 1222 may comprise 6030FR whereas foam 1220 may comprise 3015 foam, from Bergad. The ratio of the durometer of the foam, where the ratio is greater than 4:1 hard to soft, is simply an example however, and other durometer values and ratios are also possible and contemplated.

Figure 13B:
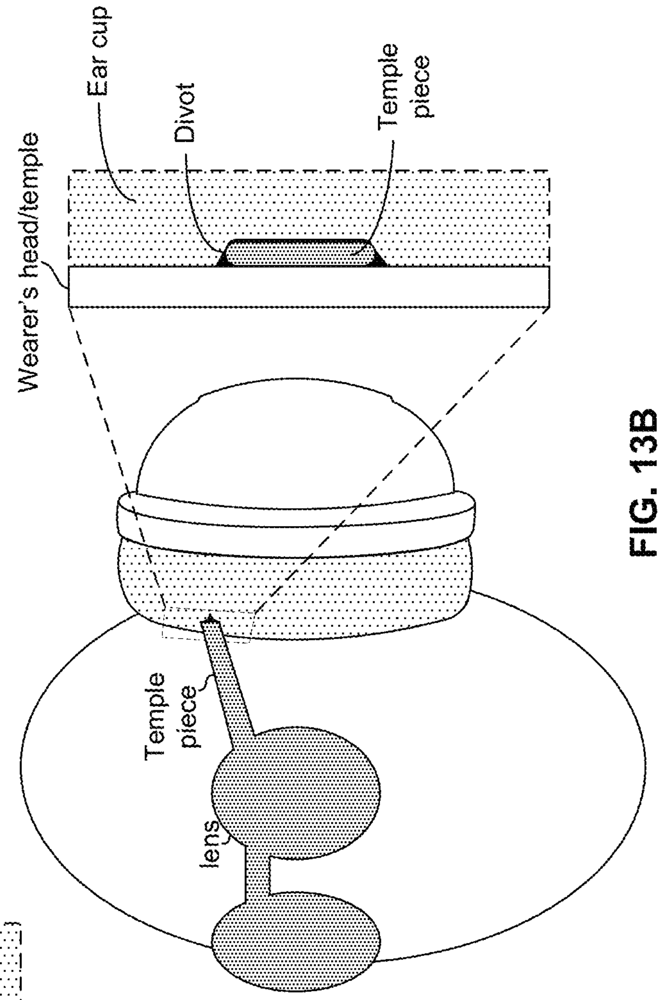
FIGS. 13A-B depict an example implementation in which the ear pieces have divots to accommodate temple pieces of eyeglasses.
Figure 13A:
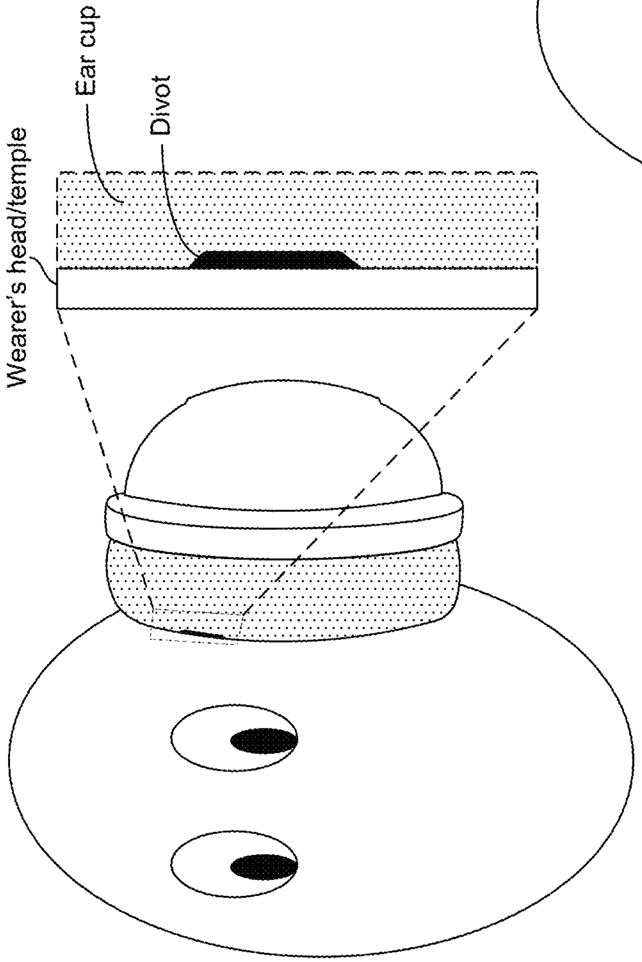

FIGS. 13A-B depict an example implementation in which the ear pieces have divots to accommodate temple pieces of eyeglasses. As shown in the example implementation illustrated in FIGS. 13A-B, the ear pieces have divots (e.g. cutoff parts or indentations) to accommodate temple pieces of eyeglasses. In this regard, the divots may be configured such that, when eyeglasses are worn concurrently with a headset by a wearer of the headset, the filler material (e.g., foam) of the headset is kept off or is pushed out of the way such that the temple pieces of the eyeglasses contact the temples of the wearer The divots may be configured as fixed—that is, they may be pre-cut based on the anticipated depth required for accommodating the temple pieces. Thus, when glasses are worn by the wearer of the headset as shown in FIG. 13B, the temple pieces of the eyeglasses may simply occupy the space created by the divots between the ear pieces and the temples of the wearer.

Alternatively, the divots may be implemented with at least some flexibility, such that when no glasses are being worn by the wearer of the headset, as shown in FIG. 13A, the elastic nature of the filler material of the ear cups (e.g., foam) closes at least some of the divots. On the other hand, when glasses are worn as shown in FIG. 13B, the filler material is pushed aside by the temple piece of the eyeglasses while creating little or no additional pressure on the temples of the wearer as compared to when the headset is worn without the eyeglasses.

For example, as shown in the embodiment shown in FIG. 13B, the filler material is compressed mostly in the horizontal direction, away from the temples of the wearer, such that any additional pressure resulting from the presence of the temple pieces (relative to when the headset is worn without the eyeglasses) is exerted in the horizontal direction onto the temple pieces, to maintain contact. In some instances, the ear pieces may be configured to accommodate the compression in the filter material resulting from expansion in the divots—e.g., incorporating hollow areas in the foam adjacent to the divots for receiving the foam that is pushed out of the way by the temple pieces.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:

an ear cup for a headset that comprises a foam that comprises a hollow area, wherein:

if eyeglasses are worn by the headset user, a portion of the foam is pushed by a temple piece of the eyeglasses to produce a divot; and the hollow area of the foam is configured to receive the portion of the foam that is pushed by the temple piece of the eyeglasses.

2. The system of claim 1, wherein the system comprises the headset.

3. The system of claim 1, wherein a the foam is in the form of a ring.

4. The system of claim 1, wherein the foam is covered by a lining.

5. The system of claim 4, wherein the lining is configured to provide heat transfer.

6. The system of claim 1, wherein the ear cup is attachable to the headset.

7. The system of claim 1, wherein the foam comprises at least two different densities of foam.

8. The system of claim 1, wherein the ear cup comprises:

a material configured to reduce heat build-up at a headset user's head; and a material configured to wick moisture away from the headset user's head.

9. The system of claim 1, wherein the portion of the foam that is pushed by the temple piece of the eyeglasses is configured to be closer to a temple of the headset user than the hollow area of the foam.

10. The system of claim 1, wherein the ear cup comprises a first foam glued to a second foam.

11. A headset comprising:

an ear cup that comprises a foam that comprises a hollow area, wherein:

if eyeglasses are worn by the headset user, a portion of the foam is pushed by a temple piece of the eyeglasses to produce a divot; and the hollow area of the foam is configured to receive the portion of the foam that is pushed by the temple piece of the eyeglasses.

12. The headset of claim 11, wherein the headset comprises two ear cups.

13. The headset of claim 11, wherein the foam is in the form of a ring.

14. The headset of claim 11, wherein the foam is covered by a lining.

15. The headset of claim 14, wherein the lining is configured to provide heat transfer.

16. The headset of claim 11, wherein the ear cup is attachable to the headset.

17. The headset of claim 11, wherein the ear cup comprises at least two different densities of foam.

18. The headset of claim 11, wherein the ear cup comprises:

a material configured to reduce heat build-up at a headset user's head; and a material configured to wick moisture away from the headset user's head.

19. The headset of claim 11, wherein the portion of the foam that is pushed by the temple piece of the eyeglasses is configured to be closer to a temple of the headset user than the hollow area of the foam.

20. The headset of claim 11, wherein the ear cup comprises a first foam glued to a second foam.

* * * * *